United States Patent
Nejdl et al.

(10) Patent No.: US 11,293,864 B2
(45) Date of Patent: Apr. 5, 2022

(54) DEVICE, USE OF THE DEVICE AND A METHOD FOR HIGH-CONTRAST IMAGING

(71) Applicant: FYZIKALNI USTAV AV CR, V.V.I., Prague (CZ)

(72) Inventors: Jaroslav Nejdl, Dolní Břežany (CZ); Martin Albrecht, Dolní Břežany (CZ); Jakub Vančura, Dolní Břežany (CZ)

(73) Assignee: FYZIKALNI USTAV AV CR, V.V.I., Prague (CZ)

( * ) Notice: Subject to any disclaimer, the term of this patent is extended or adjusted under 35 U.S.C. 154(b) by 0 days.

(21) Appl. No.: 17/093,669

(22) Filed: Nov. 10, 2020

(65) Prior Publication Data

US 2021/0131960 A1 May 6, 2021

Related U.S. Application Data

(63) Continuation of application No. PCT/CZ2020/050009, filed on Mar. 4, 2020.

(30) Foreign Application Priority Data

Mar. 14, 2019 (LU) .......................................... 101150

(51) Int. Cl.
*G01N 21/45* (2006.01)
*G01N 21/39* (2006.01)
*G01N 21/78* (2006.01)

(52) U.S. Cl.
CPC .............. *G01N 21/45* (2013.01); *G01N 21/39* (2013.01); *G01N 21/783* (2013.01)

(58) Field of Classification Search
CPC ....... G01N 21/45; G01N 21/39; G01N 21/783
See application file for complete search history.

(56) References Cited

U.S. PATENT DOCUMENTS

| | | |
|---|---|---|
| 5,656,813 A | 8/1997 | Moore et al. |
| 6,020,963 A | 2/2000 | DiMarzio |
| 6,690,472 B2 | 2/2004 | Kulp et al. |
| 8,537,365 B1 * | 9/2013 | Korman ................. G01N 21/45 356/450 |

FOREIGN PATENT DOCUMENTS

JP H1090117 A 4/1998

* cited by examiner

*Primary Examiner* — Jamil Ahmed
(74) *Attorney, Agent, or Firm* — Gabriela B. Tomescu, Esq.; Bergenstråhle & Partners AB (57) ABSTRACT

The present invention relates to a device, use of the device and a method for high contrast imaging, particularly suitable for imaging of moving object of interest such as gas expanding from a gas jet or physical or chemical or biological processes in material.

The device for high-contrast imaging comprises a beam splitter for splitting a beam into a probe beam and a reference-beam, wherein the probe beam is directed to an object; a self-imaging system for receiving the probe beam from the object and imaging the object on itself while in a preferred embodiment, the system preserves a reflected probe beam divergence. The beam interacts with the object at least twice; and the reflected probe beam is further directed to the splitter after the last interaction; and detection means receiving the probe beam from the splitter.

20 Claims, 10 Drawing Sheets

DEVICE, USE OF THE DEVICE AND A METHOD FOR HIGH-CONTRAST IMAGING

This application is the continuation of International Application No. PCT/CZ2020/050009, filed 4 Mar. 2020, which claims the benefit of Luxembourg patent application LU 101150, filed 14 March August 2019, the entire contents of which are hereby incorporated by reference.

TECHNICAL FIELD

The present invention relates to optics, in particular to a device and a method for optical probing, preferably but not exclusively for gas jet characterization, the method and device use optical means. More particular, the present invention concerns a device and a method for high-contrast imaging.

BACKGROUND ART

Gas targets are frequently used for interactions between high power lasers and gaseous medium, in particular for laser wakefield accelerators. Gas targets can be of different density and it is especially difficult to assess its density distribution above the nozzle. The gas density may vary, but it is usually between $10^{16}$ atoms/cm$^3$ to $10^{19}$ atoms/cm$^3$ and the target lengths vary from sub-millimetre to centimetres. Furthermore, the index of refraction of typical gases (mostly noble gases are being used) is very close to unity. Therefore, it is challenging to measure density distribution or even parametrize the properties of the gas jet with high precision for low density gas jets with small dimensions.

In order to obtain laser-driven accelerator providing secondary particles (secondary radiation), such as electrons having energy reaching 10 GeV, uniform-density gas medium (or gas medium with well-known density profile) through which a laser beam can propagate is required. Therefore, a device and a method for characterization of such gas target is needed. According to well established state of the art method, the gas density distribution can be measured by interferometry either in single projection or tomographic configuration and validated using computational fluid dynamics. Second well established method is to use absorption of the probe beam to assess the density distribution.

Figure 1:
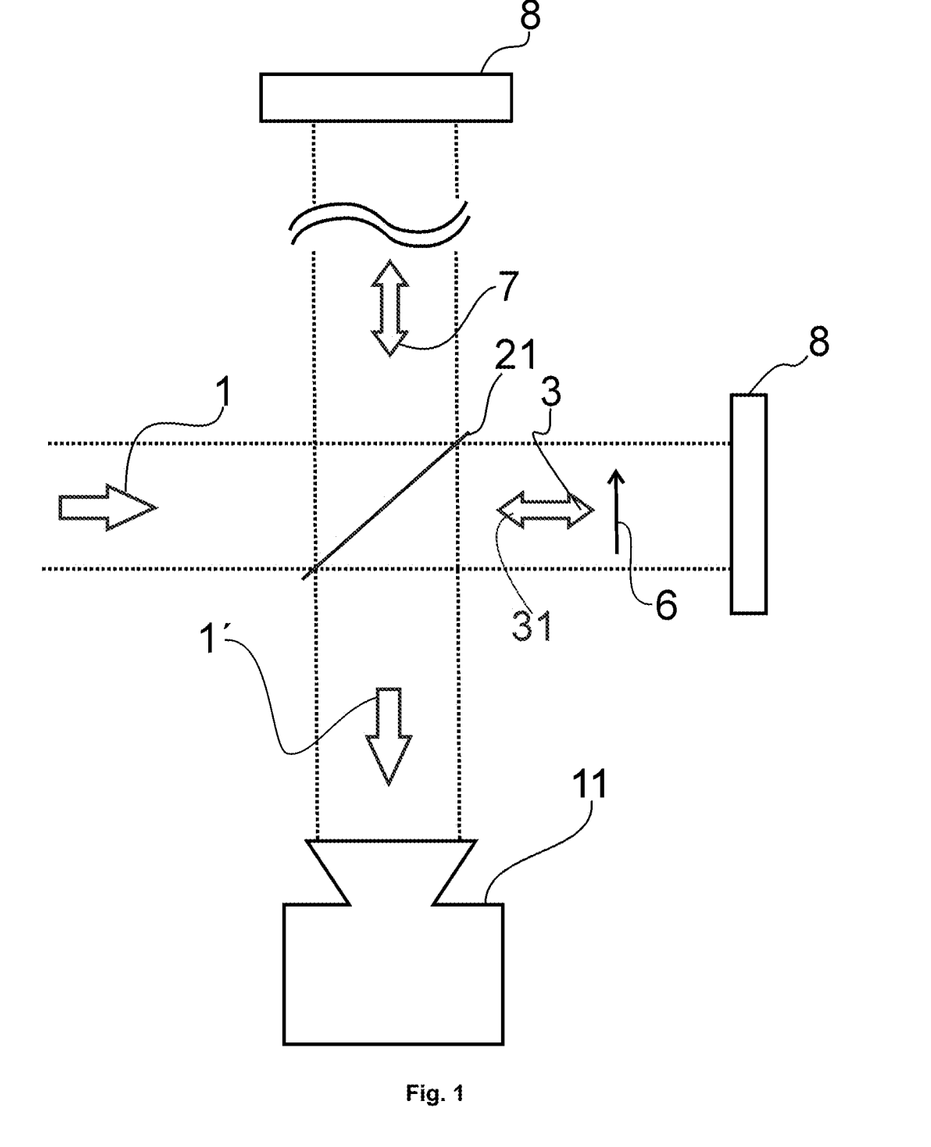
FIG. 1 illustrates an embodiment according to the state of the art based on Michelson Interferometer.

In general, the state of the art interferometry method adopts a Michelson Interferometer as shown in FIG. 1. The light beam 1 from the probe laser source is split into two parts 3 and 7 using a beam splitter 2 with nearly equal amplitudes as shown in FIG. 1. These beams are reflected back at two mirrors 8 and returned back to the splitter 2. For measuring its refractive properties the object 6 is placed into one of the arms of interferometer such a way that the beam passes through it two times.

The output of the interferometer depends on the phase difference between light rays traversing the two arms. The spatial shift in the fringe pattern can be measured as a voltage change using a fast photo diode or a photomultiplier tube or intensity modulation change detected by an area detector (e.g. a CCD camera). The above-mentioned solution provides two passes of the probe through the medium—increasing the effect of the object on the beam. However, it does not allow proper imaging, so the information about spatial distribution is lost.

Figure 2:
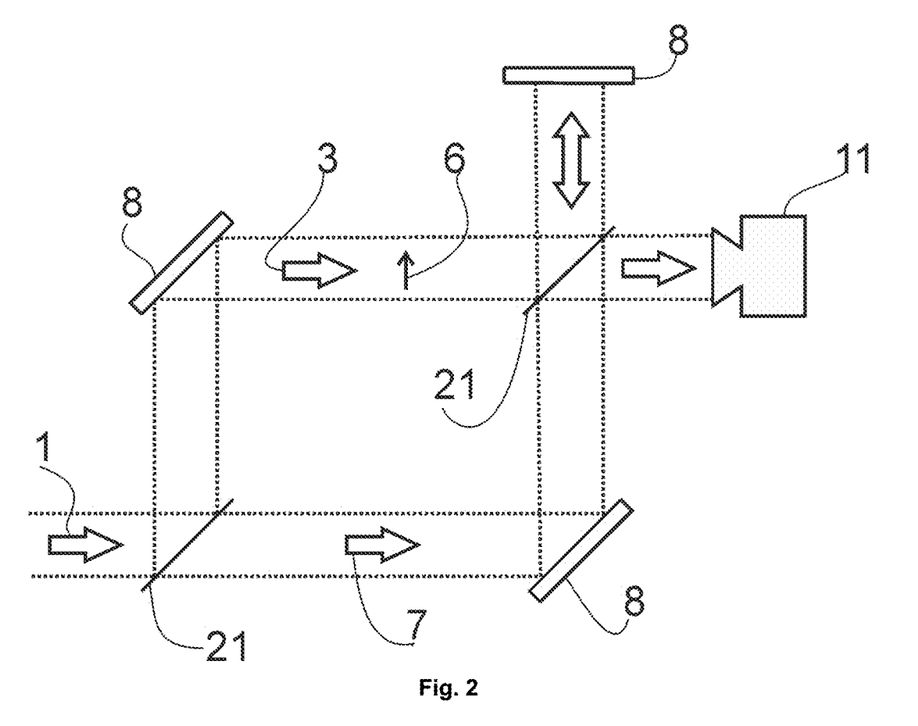
FIG. 2 illustrates embodiment according to the state of the art based on Mach-Zehnder interferometer.

To avoid this, Mach-Zehnder interferometer can be used with imaging the object on a detector. There is, however, only one pass of the probe through the object possible, which results in rather low sensitivity of the measurement. In the Mach-Zehnder interferometer, as shown in FIG. 2, the probe beams follow different pathways 3 and 7 before recombination of the beams. This may simplify the interpretation of the observed fringes, the probe beam is, however, passing through the object of interest only once.

Document U.S. Pat. No. 6,690,472 discloses a system for imaging a gas leaked from a pipe or container. The system comprises a light radiation source and a detector which detects backscattered light radiation. The laser source illuminates the gas which is subsequently visualized when the light radiation is absorbed. In particular, the gas image is produced when the gas attenuates the backscatter radiation return from solid object in an imaged scene. The document further discloses drawback relating to a signal-to-noise ratio. In particular, if the signal-to-noise ration of the return signal is 1:10, attenuation by the gas would cause a reduction in return signal that is equal to the noise level and therefore making it undetectable.

Similar technical problem relating to signal-to-noise ratio is discussed in U.S. Pat. No. 5,656,813. The solution to the problem is presented as a device comprising a filter capable of splitting an infrared beam into two parts with respect to a wavelength. First part serves as a reference beam wavelength and a second part serves for probing the gas. The present solution, however, has drawbacks, such as involving at least two detectors (an infrared video camera and visible light video camera) and corresponding electronics in order to visualise the resulting picture of the gas. Furthermore, the wavelength must correspond to certain absorption or transmission feature of the gas. Therefore, one must expect only certain set of gases for which the apparatus, resp. method can be applied.

The technical problem to be solved by the present invention and in respect to the above described prior art is to provide a device and method which is capable to probe and image an object with low contrast (in absorption, phase-shift or polarization change) with increased sensitivity (contrast).

SUMMARY OF INVENTION

According to a first aspect of the present invention, a device for high-contrast imaging is provided. Said device comprises a beam splitter which splits an incident beam to a probe beam and a reference beam. The probe beam is further directed to an object of interest. The reference beam can be in some embodiment directed to a beam dump, in another embodiment is directed to a planar mirror. The device further comprises a self-imaging system receiving the probe beam from the object that is capable to image the object on itself, preferably while preserving the beam divergence. Accordingly, the probe beam interacts with the object at least twice. A first interaction is provided when the probe beam is propagating from the splitter to the self-imaging system. The second interaction is provided when the beam is reflected from the self-imaging system to the beam splitter.

Therefore, the probe beam interacts, for example passes through, with the object at least twice and furthermore, the object is imaged on itself. The spatial information is thus preserved in this two-interaction configuration. The device further comprises a detection means which can be represented, in its simplest form, by a detector which analyses the resulting probe beam.

The present invention thus provides a device, resp. method as described below, for analysis of structural characteristics of objects under investigation with improved sensitivity while keeping the spatial resolution of the characterization unaffected.

In some embodiment, the beam can be an electromagnetic radiation beam, for example visible optical beam, microwave radiation, IR, NIR, UV or EUV radiation beam. According to another embodiment, the beam can be also a beam of mass particles, for example electrons. The optical beam can be advantageously used for imaging of density distribution of optical transparent materials, such as gas targets, or optical reflective material, such as metal or biofilms, in order to image a natural phenomenon running in said material. Said natural phenomenon can be a transport phenomenon taking place in biotechnological separation processes and in controlled-release pharmaceuticals, for example. On the other hand, an electron beam can be used for holography which employs the phase distribution of an electron beam transmitted through or reflected from a sample that can be displayed as an interference micrograph.

Said beam splitter can be a partially reflective mirror or polarizing beam splitter or diffraction grating. In a preferred embodiment, the beam splitter serves to divide and recombine a probe beam and a reference beam. For light radiation, the beam splitter can be an optical splitter, such as partially reflecting metal or dielectric film on a transparent substrate. For beam of electrically charged particles, such as electron, the splitter can be Mollenstedt-type electron biprism. In yet other embodiment, for radiation of mass particles, the beam splitter may be based on splitting the beam in accordance with applied magnetic field.

Said self-imaging system receiving the probe beam from the object is capable to image the object on itself while, in preferred embodiment, the system preserves the beam divergence. Said system can comprise an imaging element, such as a lens which focuses the first part of the beam of particles or waves in front of a concave reflector creating an image of the object of interest on the reflector. The reflector reflects the probe beam back towards the imaging system and to the beam splitter. Said object of interest is placed between the beam splitter and the lens. In another embodiment, the self-imaging system can comprise plurality of lenses. In another embodiment, the self-imaging system can comprises plurality of curved mirrors configured to receive and transmit the beam to the concave reflector.

The object of interest is herewith referred to an object with the meaning of geometrical optics. The term of an object with the meaning of geometrical optics is a common general knowledge of the skilled person in the art. However, according to standard definition, it shall be understand that the object is anything that is being viewed, e.g., when one looks at a tree through a lens, with a mirror or by any other optical device the tree is referred to as an optical object. In parallel to geometrical optics, the object shall be understood anything to be viewed or analysed for mass particles as well. The object thus can be a mass sample, such as particular material, or even a field, such as electric or magnetic field.

According to even more preferred embodiment, the object of interest is a transparent object. The transparent object can be represented by a gas expanding from a gas jet suitable for laser-matter interaction. The special embodiment allows characterization of gas density distribution of the gas.

In some embodiments, the lens can be a lens for optical radiation. In other embodiments, the lens can be a magnetic or electric lens for electrically charged particles. In yet other embodiments, the lens can be a magnetic lens for neutron beam.

The detection means can be an area array detector (camera) or a wavefront sensor or scintillator or any suitable solid state radiation detector for mass particles. The detection means can detect recombined beams in order to record an interference pattern or wavefront of the single beam, in particular the wavefront aberration (if reference beam is not used). The detection means can be further connected to a computer machine providing a mathematical operation with the records. Those can be numerical object reconstruction methods using wave propagation algorithms, if proper imaging of the object on the area detector is not performed; Abel inverse transform of a single object projection, if the object is considered to be cylindrically symmetrical, or any of computer tomography techniques employing several projections of the object that does not possess the cylindrical symmetry.

In a preferred embodiment, the detection means can comprise: a lens for imaging of the object plane on a detector and said detector, if numerical imaging of the object is not performed.

According to another embodiment, the object of interest is a reflective surface. The reflective material can be an optical mirror which imperfections (roughness, surface figure) are characterized. Advantage of this embodiment is the multiple reflection with preserved spatial resolution.

According to another embodiment, the device further comprises a quarter-wave plate positioned between the beam splitter and the object. This enables probing the object with circularly polarized light.

According to another embodiment, the device further comprises a half-wave plate positioned between the beam splitter and the object. This embodiment allows probing optical anisotropy of the object (the phase-shift of the probe induced by the object in dependence on the direction of linear polarization of the probe).

It is a further object of the present invention to provide a device for high-contrast imaging wherein the probe beam is interacting with the object at least four-times. Such a device comprises a beam splitter according to the description above. The device further comprises a polarizing beam splitter receiving the beam from the beam splitter. The polarizing beam splitter transmits a beam according to its polarization to an object. The device further comprises a first branch comprising a quarter-wave plate receiving the probe beam from the object; a first self-imaging system receiving the beam from the quarter-wave plate and reflecting the beam back to the quarter-wave plate, the object and a polarizing beam splitter. The device further comprises a second branch receiving the beam from the first branch, wherein the second branch comprises a second self-imaging system. The device further comprises a detection means as described above.

In more preferred embodiment, the beam splitter splits the beam into a probe beam and a reference beam, wherein the detector detects an interference pattern.

The present embodiment is particularly useful for further increasing the signal to noise ratio of the characterization of an object that does not change the polarization state of the probe.

It is another object of the present invention to provide a device wherein a probe beam interacts with the object of interest n-times, where n is a natural number. The device for high-contrast imaging comprises the beam splitter according to the description above. The device further comprises the polarizing beam splitter above described as well. Furthermore, the device comprises a first branch comprising a Pockels cell receiving the beam from the polarizing beam splitter and transmitting the beam to an object of interest; a first self-imaging system receiving the beam from the object of interest and reflecting the beam back to the object, the Pockels cell and a polarizing beam splitter. The device further comprises the second branch according to the description above; and the detection means.

The embodiment as described above provides the possibility to further increase the sensitivity (or signal-to-noise ratio) by multiple interactions of the probe beam with the object while preserving the spatial information by self-imaging of the object. This embodiment is particularly useful for probing an object which does not change a polarization of the probing beam.

According to another aspect of the present invention a method for high-contrast imaging is provided. The method comprises the step of:
a. providing an incident beam directed to a beam splitter splitting the beam into a probe beam and a reference beam, wherein the probe beam is directed to an object;
b. providing a first interaction of the probe beam with an object;
c. providing an image of an object on itself, more preferably while preserving the probe beam divergence, wherein a reflected probe beam interacts with the object at least twice;
d. directing of the reflected probe beam to the beam splitter after the last interaction; and
e. detection of the beam.

According to preferred embodiment, the step c further comprises the step of:
f. focusing of the probe beam by an imaging system; and
g. reflection of the probe beam on a concave mirror providing the reflected probe beam;
h. direction of the reflected probe beam back to an imaging system and object.

According to another preferred embodiment, the method further comprises the step of:
i. detection of an interference pattern via a recombined beam.

In a preferred embodiment, the interaction of the first beam with an object is transmission or reflection, wherein the object is affecting amplitude, phase or polarization of the probe beam.

In another preferred embodiment, the method comprises a step of providing a circular polarization of the probe beam before step b).

In another preferred embodiment, method further comprises the step of rotating the linear polarization of the probe beam before step b).

It is another preferred embodiment of the present invention to provide a method for at least 4-times interaction. The method further comprises the steps in the following order:
j. further direction of the probe beam to a polarizing beam splitter;
k. splitting of the probe beam according to its polarization, wherein the probe beam is directed to an object;
l. providing a change of polarization via double transmission through a quarter-wave plate;
m. focusing and reflection of the probe beam on a first self-imaging system of the object;
n. transmission through or reflection on the polarizing beam splitter;
o. focusing and reflection of the beam on a second self-imaging system of the object;
p. transmission through or reflection on the polarizing beam splitter;
q. providing change of polarization via double transmission through the quarter-wave plate;
r. focusing and reflection of the probe beam on a first self-imaging system of the object;
s. reflection or transmission by the polarizing beam splitter.

It is another preferred embodiment of the present invention to provide a method for at least n-times interaction, where n is a natural number. The method further comprises the steps in the following order:
t. further direction of the probe beam to a polarizing beam splitter;
u. splitting of the probe beam according to its polarization, wherein the probe beam is directed to an object;
v. providing a change of polarization via transmission through a Pockels cell;
w. focusing and reflection of the probe beam on a first self-imaging system of the object;
x. transmission through or reflection on the polarizing beam splitter;
y. focusing and reflection of the beam on a second self-imaging system of the object;
z. transmission through or reflection on the polarizing beam splitter;
aa. providing change of polarization via the Pockels cell;
bb. focusing and reflection of the probe beam on a first self-imaging system of the object;
cc. reflection or transmission by the polarizing beam splitter.

The effect of the object on the probe is enhanced by multiple interaction while the spatial information is preserved If an electromagnetic wave is being used as a probe beam, one can measure:
1) spatially resolved absorption or reflectivity of the object—increasing the absorption (reflectivity) contrast due to multiple interactions,
2) spatially resolved phase-shift of the probe induced by the object—multiplying the phase-shift with respect to single interaction, or
3) spatially resolved optical anisotropy—increasing the effect of the object on polarization of the probe by multiple interactions.

DESCRIPTION OF EMBODIMENTS

Figure 3:
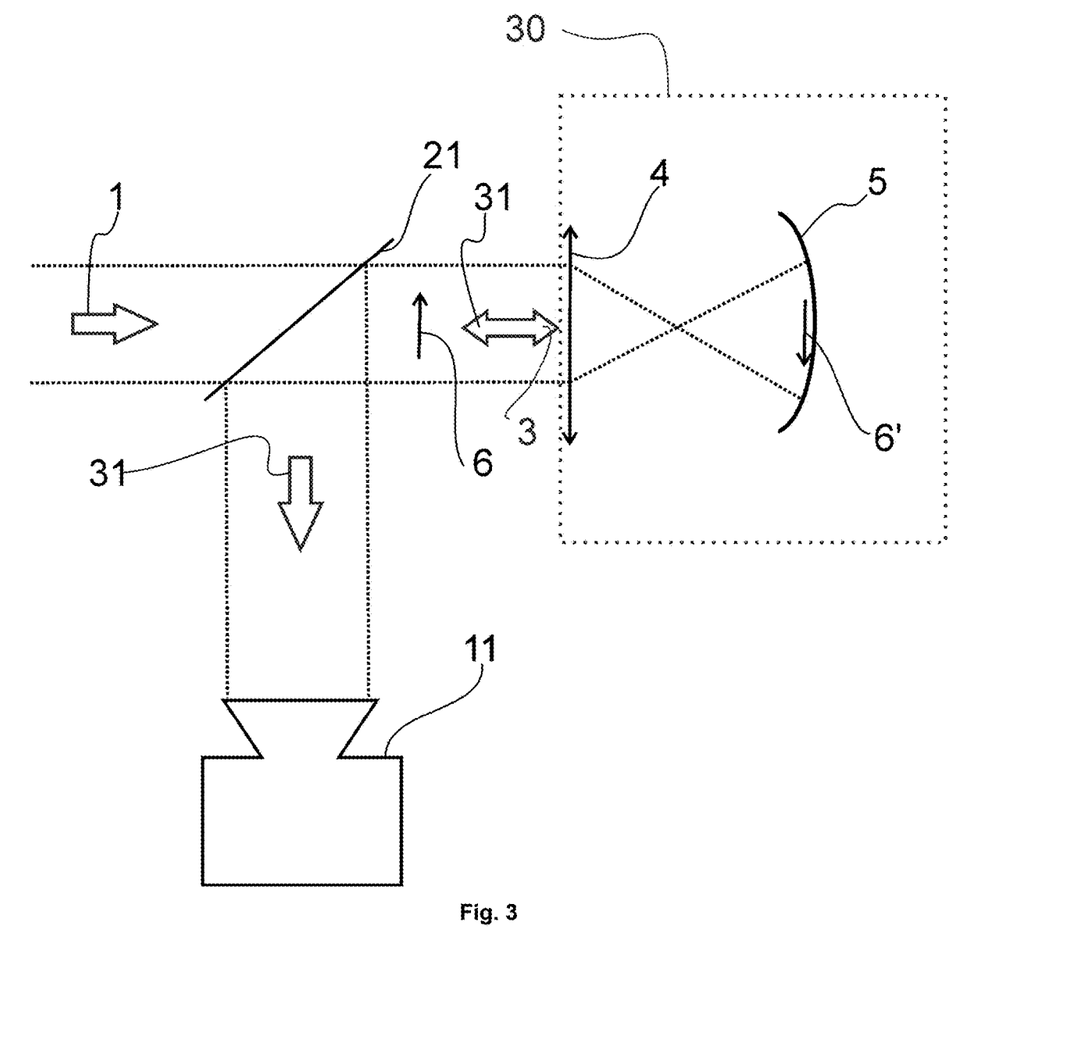
FIG. 3 illustrates a first embodiment according to the present invention.

FIG. 3 shows a first embodiment of the present invention. In the first embodiment, an incident beam 1 of optical radiation is directed to a beam splitter 21. The beam splitter 21 which splits the incident beam 1 into a probe beam 3 and reference beam 7. Probe beam 3 is further directed to an object under investigation (e.g. a gas target) 6. Gas, for example, may escape from a gas jet. The probe beam 3 is further directed to a self-imaging system 30 for receiving the probe beam 3 from the object 6. Such a self-imaging system 30 is capable of imaging the object 6 on itself. In a preferred embodiment, the system 30 preserves the reflected beam 31 divergence. In a preferred embodiment, the system 30 comprises a lens 4 which focuses the probe beam 3 in front of a concave mirror 5 and creates an image 6' of the object 6 on that mirror 5. The mirror 5 reflects the probe beam 3 back to the lens 4, providing a reflected probe beam 31. In a preferred embodiment the concave mirror 5 creates a focus of the reflected probe beam 31 at the same location as was the focus of the probe beam 3 created by the lens 4. The lens 4 images the image 6' of the object 6 on itself. The beam 3 resp. 31 probes the same object 6 and therefore interacts with the gas for the second time. In the first embodiment the reference beam 7 can be directed to a beam dump (not shown in the FIG. 3), for example.

After the second interaction of the reflected probe beam 31 with the object 6, the reflected probe beam 31 is directed to the beam splitter 21 which is redirecting the reflected probe beam 31 to detection means 11. The redirected probe beam 31 can thus provide information on wavefront disturbance caused by the object 6, for example. The detection means 11 can be an area detector 110 (e.g. CCD camera) with focusing optics, e.g. focusing lens 9, wavefront sensor or another imaging device suitable for diagnostics of the beam. The records of detection means 11 can be further processed by a computation unit using mathematical methods to assess properties of the object, e.g. density distribution of the gas (not shown in FIG. 3).

Figure 4:
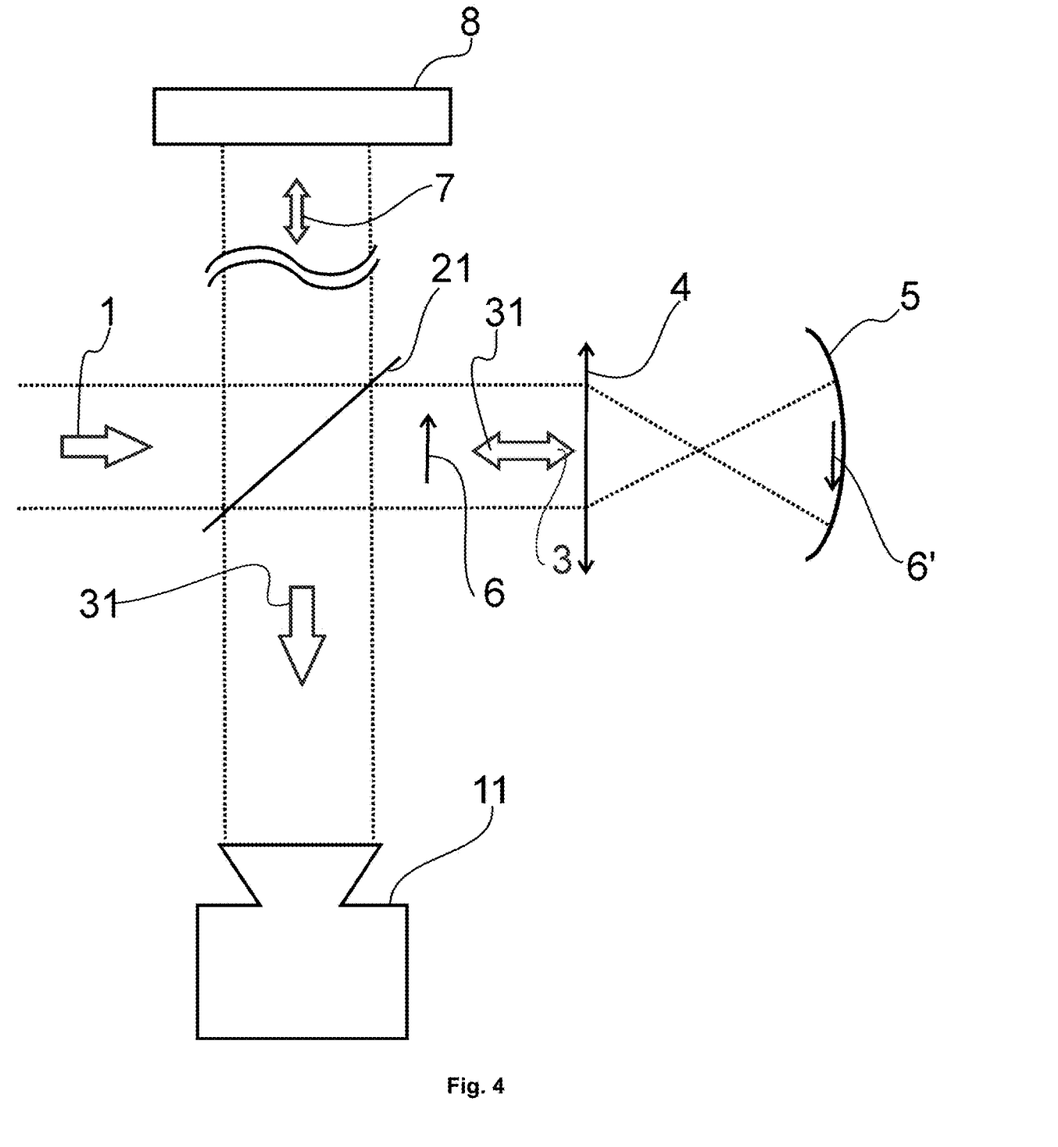
FIG. 4 illustrates a preferred embodiment of the first embodiment according to the present invention.

In more advantageous embodiment, as shown in FIG. 4, said beam splitter 21 splits the incident beam 1 into at least two parts. The first part serves as a probe beam 3 and is directed to an object under investigation (gas target) 6. The second part of the beam is directed to a planar mirror 8 and serves as a reference beam 7. After second interaction of the reflected probe beam 31 with the object, the beam 31 is directed to a beam splitter 21 which redirects it to a detection means 11. The beam 1' is recombination of both redirected probe beam 31 and reference beam 7. The detection means 11 can be an area detector (e.g. CCD camera) with focusing optics. The detector can record an interference pattern which can be further processed by a computation unit using mathematical methods to assess the optical properties of the object, e.g. the density distribution of the gas (not shown in FIG. 4).

Figure 5:
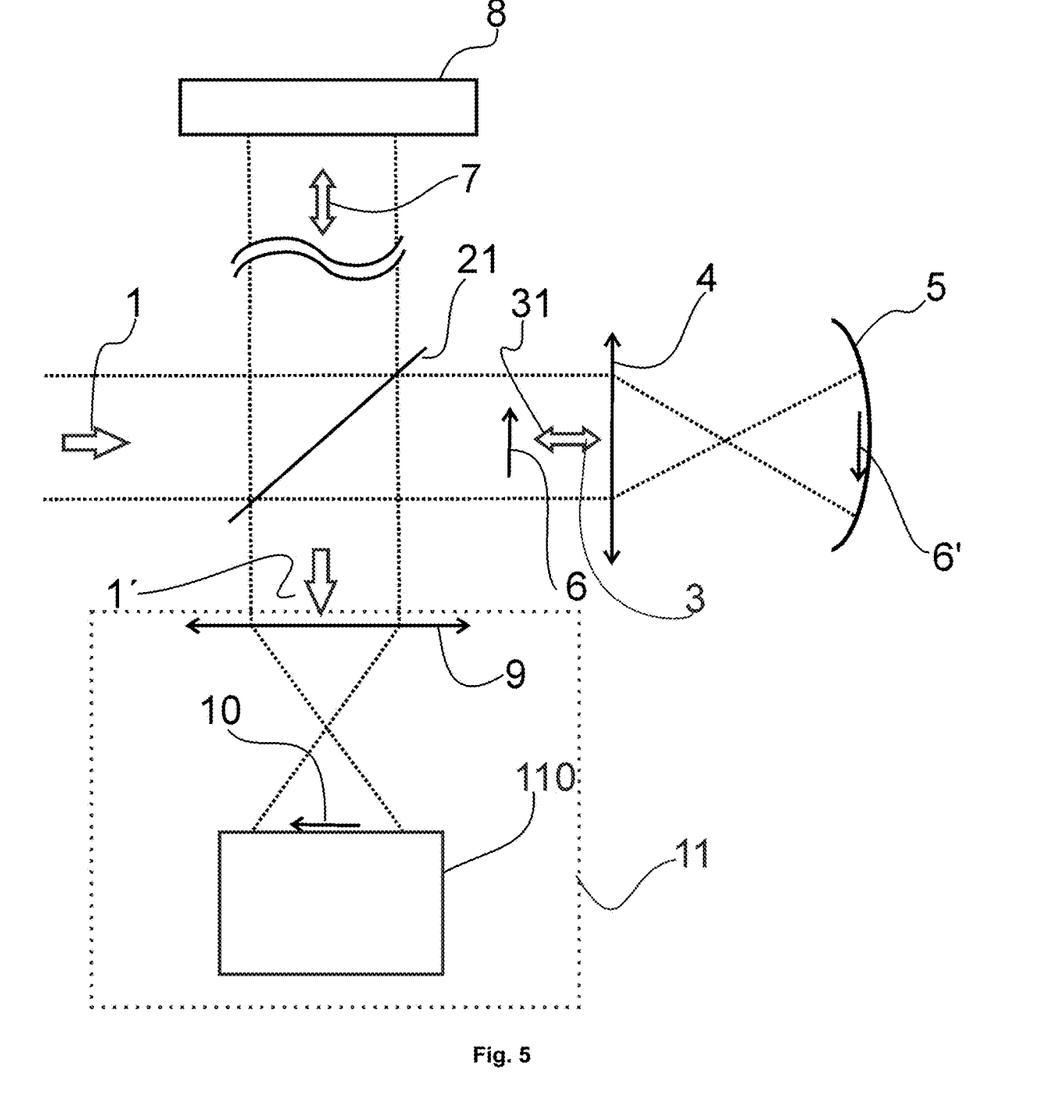
FIG. 5 illustrates a preferred embodiment of the first embodiment according to the present invention, where the embodiment is further provided with a focusing system to create an image of the object on a detector.

In another advantageous embodiment, shown in FIG. 5, the reflected probe beam 31 after the second interaction, resp. recombined beam 1' can be further focused by means of an imaging system 9 (e.g. a lens) providing an image 10 of the object 6 to be analysed. The imaging system 9 together with the detector 110 forms a detection means 11.

The technical effect provided by the above-mentioned layouts is the twofold increase of the sensitivity of the optical probing method (imaging for absorption studies, interferometry for phase-shift studies, and/or methods to assess polarization effects of the object).

Figure 6:
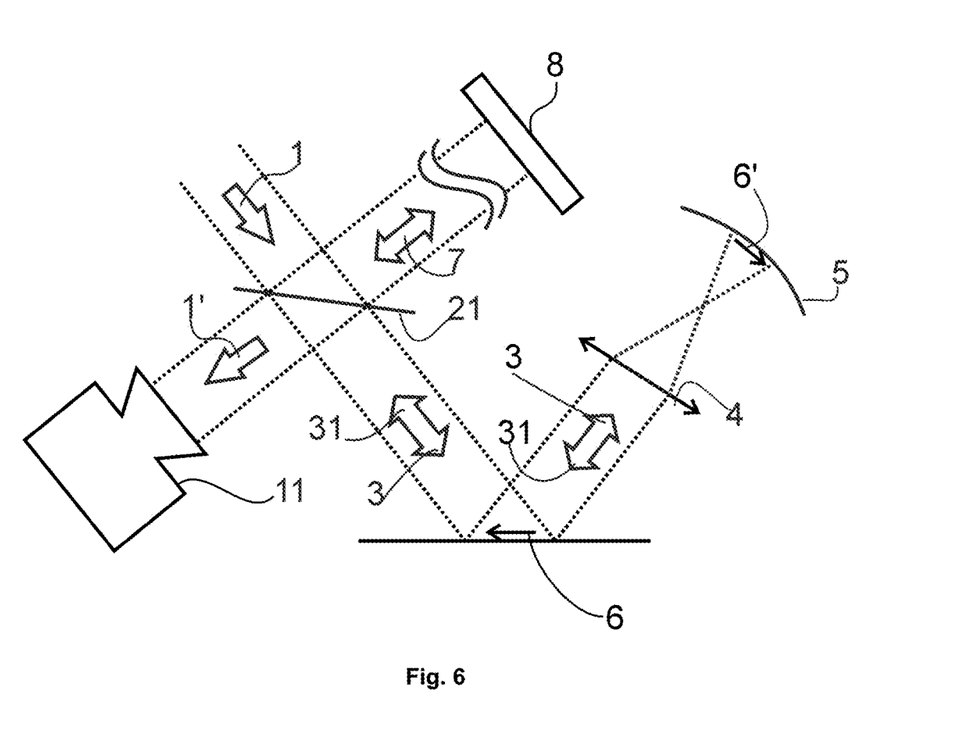
FIG. 6 illustrates a second embodiment according to the present invention.

FIG. 6 represents a second embodiment. According to the second embodiment, an optical incident beam 1 is directed to a beam splitter 21. The beam splitter 21 splits the beam 1 into two parts. First part serves as a probe beam 3 and is directed to an object of interest 6 which is capable to reflect the probe beam 3. Second part is directed to a planar mirror 8 and serves as a reference beam 7.

In accordance with the second embodiment, the object of interest 6 can be material which reflects the probe beam 3 and is, for example, a subject of analysis. The probe beam 3 is subsequently directed to an imaging system 4 and reflected by a concave mirror 5 back to the imaging system 4. The reflected probe beam 31 is directed to the object 6 and probes its material structure for the second time. Once the reflected probe beam 31 interacts with the material for the second time, it is subsequently directed to the beam splitter 21, which directs the reflected probe beam 31 to detection means 11. The detector analyses the optical disturbance of the probe beam caused by the object by assessing its amplitude, phase and/or polarization state.

In more advantageous embodiment, the recombined beam 1' can be further focused by means of a second imaging system 9 providing an interference pattern at the image plane.

The second embodiment of the present invention can be suitable for investigation of reflecting interfaces where the effect of those can be imprinted in amplitude, phase, and/or polarization of the probe beam, respectively. One can assess information about spatially resolved reflectance, surface profile, and/or anisotropy caused by e.g. surface tension.

Figure 7:
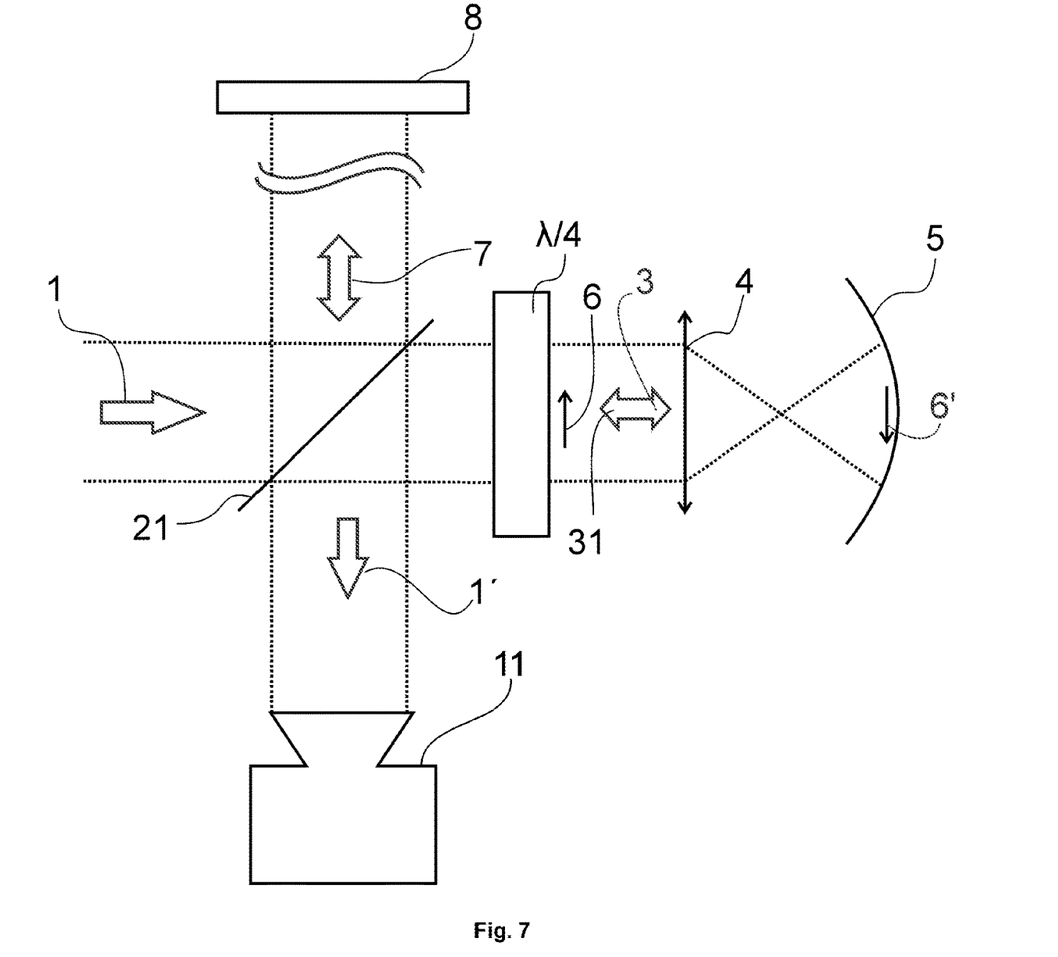
FIG. 7 illustrates a third embodiment according to the present invention.

FIG. 7 represents a third embodiment. In accordance with the third embodiment, a linearly polarized incident beam 1 is directed to a beam splitter 21 which splits the beam 1 into a probe beam 3 and a reference beam 7. The reference beam 7 is directed to a planar mirror 8. The probe beam 3 is directed to a quarter-wave plate $\lambda/4$. In the quarter-wave plate $\lambda/4$, linear polarization of the beam 3 changes to a circular polarization. An advantage of the circular polarization can be employed, for example, for investigation of spatial distribution of chiral compounds. Once the probe beam 3 probes the object of interest 6, it is focused by imaging system 4 and reflected by a concave mirror 5 back to the imaging system 4 so that the object 6 is imaged on itself. The reflected part of the circularly polarized reflected probe beam 31 probes the object 6 for the second time and is directed back to the splitter 21. Splitter 21 directs the reflected probe beam 31, wherein a recombined beam 1' is directed to a detection means 11. The resulting recombined beam 1' can be further characterized by standard optical methods (imaging, interferometry, wavefront sensing, polarimetry/ellipsometry).

Figure 8:
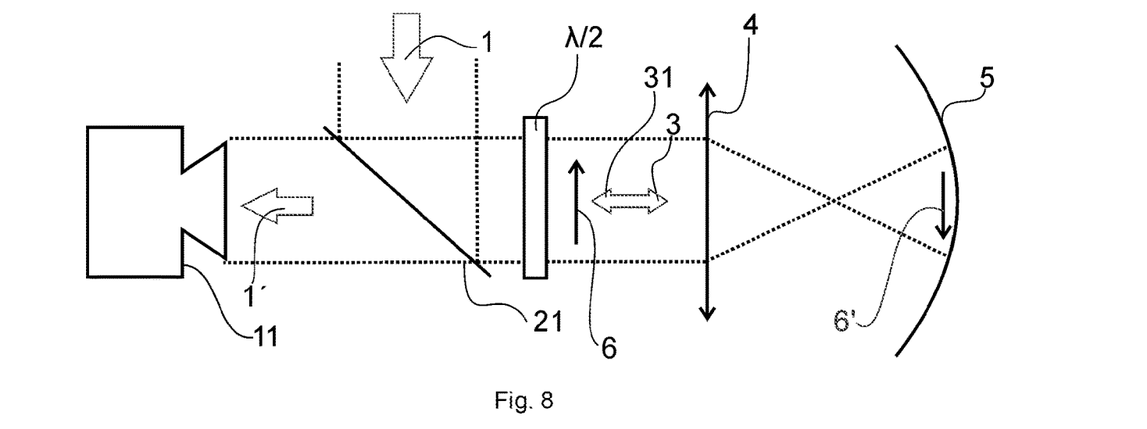
FIG. 8 illustrates a fourth embodiment according to the present invention.

FIG. 8 represents a fourth embodiment. The fourth embodiment comprises a source of a linearly polarized incident beam 1 directed to a polarizing splitter 21. The splitter 21 splits the linearly polarized beam 1 into two parts with orthogonal polarizations, a first part serves as a probe beam 3 and a second part serves as a reference beam 7.

The first part 3 is directed to a half-wave plate $\lambda/2$, where the vector of polarization is rotated arbitrarily. The object to be analyzed 6 is positioned between the half-wave plate $\lambda/2$ and an imaging system 4. The probe beam 3 is directed through the object 6. Subsequently, the probe beam 3 is directed to the object 6 for the second time after reflection from a concave mirror 5. The reflected probe beam 31 is further directed to the half-wave plate $\lambda/2$, which rotates the polarization back to the original direction, unless it is affected by the object, and the reflected probe beam 31 is directed to the splitter 21 which releases the recombined beam 1' into a detection means 11.

The present embodiment is particularly suitable for analyzing an object showing optical anisotropy, which can be naturally present or induced by e.g. material tension.

In further embodiments, not shown in the figures, an electron beam can be used.

The embodiments involving an electron beam can be especially suitable for electron holographic interferometry which enables electron imaging and spectroscopy techniques. The electron beam which can be emitted by electron gun providing a coherent electron beam is directed to a splitter. The splitter is configured to split the electron beam into a first part and a second part. The electron beam splitters can be splitter as currently known in the state of the art, such as Mollenstedt-type electron biprism or splitters based on principle of splitting the beam in accordance with applied magnetic field.

The first part of the electron beam is directed to an object to be analyzed and which is capable to change phase of the electron beam. The object to be analyzed may be, for example, an external magnetic or electric field which is too week for analysis by conventional methods. The object is positioned between the Mollenstedt-type electron biprism and an electron lens. The lens focuses the first part electron beam in front of an electron reflector, for example an electrically charged layer on a concave-shaped object. At the same time the object is imaged on the reflector. The second part electron beam serves as a reference beam.

After recombination of both parts of the beam, a detector (a scintillator or a gas detector with imaging optics) detects a resulting image. The resulting image may be an interference fringe pattern recorded as an electron-hologram.

Figure 9:
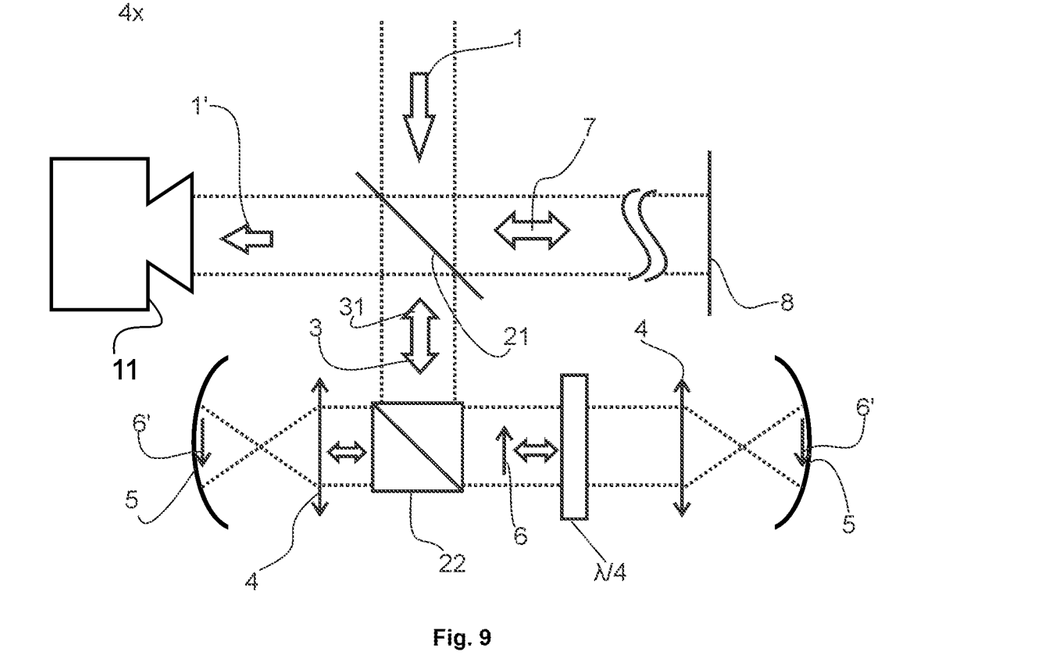
FIG. 9 illustrates a fifth embodiment according to the present invention.

FIG. 9 shows the fifth embodiment according to the present invention. The fifth embodiment allows probe an object 6 at least 4-times. The device in accordance with the fifth embodiment comprises an incident beam 1 incident on a beam splitter 21. The beam splitter 21 splits the beam 1 into two parts. First part serves as a probe beam 3 while second part serves as a reference beam 7. The reference beam 7 is directed to a planar reflector such as a planar mirror 8 which reflects the reference beam 7 back to the splitter 21. The first part is further directed to a polarizing beam splitter 22 which splits the probe beam 3 in accordance with a polarization. The probe beam 3 having polarization capable of transmission is subsequently directed to a first branch shown on the right in the FIG. 9. The first branch comprises an object 6 and a quarter-wave plate $\lambda/4$. The quarter-wave plate $\lambda/4$ alters the polarization state of a light wave travelling through it, in particular the quarter-wave plate $\lambda/4$ converts linearly polarized light into circularly polarized light. The first branch further comprises a first self-imaging system 30 configured to receive the probe beam 3 from the quarter-wave plate $\lambda/4$. The self-imaging system comprises a first imaging system 4 and a first concave mirror 5 which is configured to reflect the probe beam 3 from the imaging system 4 preferably imaging the focal spot of the system 4 on itself. The mirror 5 reflects the probe beam 3 to the imaging system 4, therefore the system 30 reflects the beam back to the quarter-wave plate $\lambda/4$, the second interaction of the probe beam 3 and object 6 is provided ensuring the self-imaging of the object, more preferably while preserving the beam divergence. The probe beam 31 is subsequently directed to a second branch, shown on the left in the FIG. 9, the second branch comprises a second imaging system 4 and a second mirror 5 substantially providing a second self-imaging system 30 of the object and reflection of the beam 3. The beam 3 is subsequently directed to the first branch again providing that a third and fourth interaction with the object 6. The quarter-wave plate $\lambda/4$ ensures turning of the probe beam 3 polarization before the second interaction of the probe with the object by 90 degrees that ensures the transmission of the polarizing beam splitter 22, after the fourth passage of the beam through the quarter-wave plate $\lambda/4$ the polarization is turned back to the original direction which ensures the reflection of the probe beam 3 by the polarizing beam splitter 22 providing the beam 31. The beam 31 is further directed to a beam splitter 21 reflecting it to a detector 11. The detector 11 analyses the optical effects of the object on the probe beam (its amplitude or phase).

This embodiment increases the sensitivity of the measurement (signal-to-noise ratio) due to quadruple interaction of the probe beam with the object while preserving the spatial resolution. It is particularly advantageous for optically isotropic objects.

Figure 10:
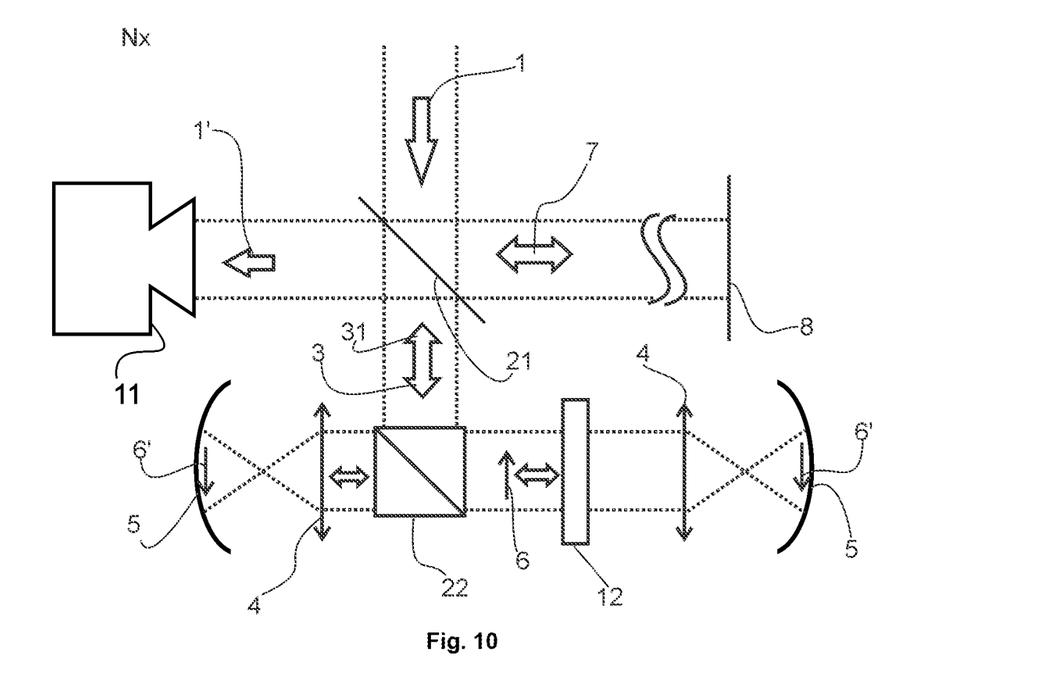
FIG. 10 illustrates a sixth embodiment according to the present invention.

FIG. 10 shows the sixth embodiment according to the present invention. The sixth embodiment allows probing the object 6 n-times, where n is a natural number. A device in accordance with the sixth embodiment comprises a beam splitter 21. An incident beam 1 is a pulsed laser radiation which is incident to the beam splitter which splits the incident beam 1 into a probe beam 3 and a reference beam 7. The probe beam 3 is further directed to a polarizing beam splitter 22. The polarizing beam splitter 22 reflects the probe beam 3 according to its polarization to a first branch. The first branch comprises a Pockels cell 12 configured to rotate the polarization of the beam 3 that passes through it in accordance with the applied voltage. The moments of polarization rotation, i.e. voltage pulse delay is selected in accordance with the desired number of interaction with the object 6. The probe beam 3 continues from the Pockels cell 12 to an object 6 and self-imaging system 30. The self-imaging system comprises an imaging system 4 and a concave mirror 5. The reflected probe beam 31 is passing through the same features to the second branch which is substantially same as described in the fifth embodiment. After the n-th interaction, the reflected probe beam 31 is reflected back to the beam splitter 21 for at least partial reflection and continues to detection means 11. The embodiment is particularly useful in manifold increase of the effect of the object on the probe.

It shall be understood that the object 6 in the fifth and the sixth embodiments can be a reflective interface in accordance with the teaching of the second embodiment of the present invention.

Figure 11:
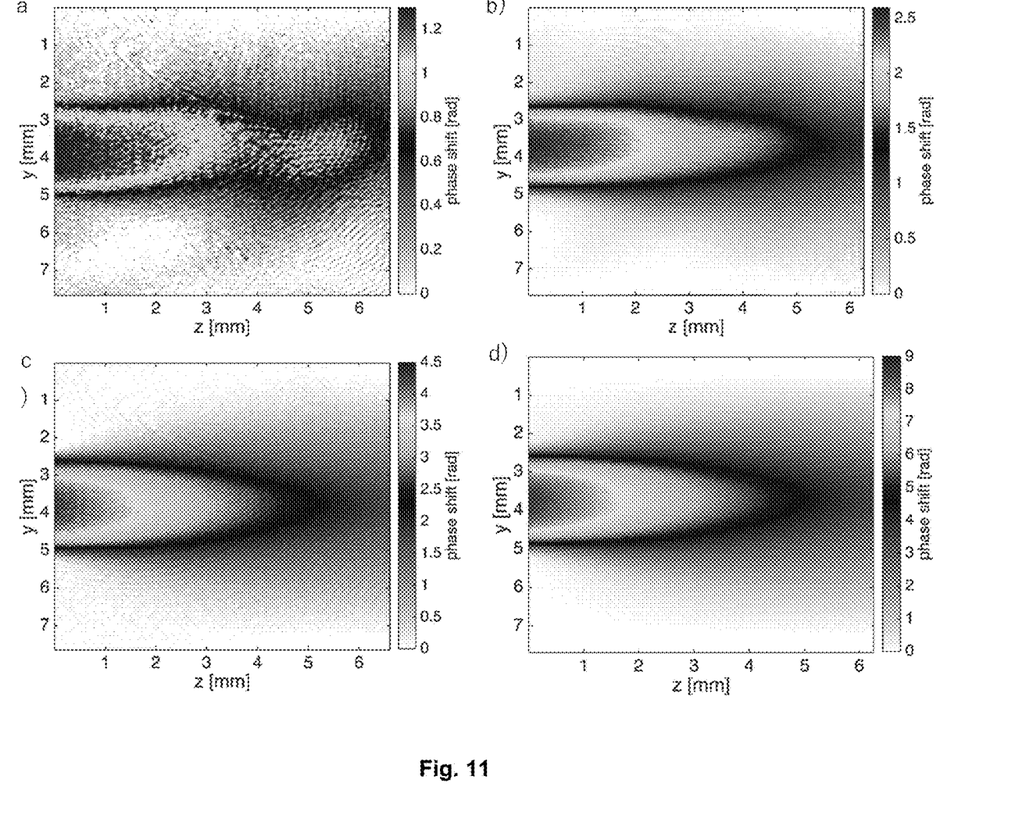
FIG. 11 (left column) shows phase maps recorded in accordance with the state of the art embodiment of Mach-Zehnder interferometer (FIG. 2) compared with the embodiment shown in FIG. 5. (right column). The object was a supersonic argon gas jet probed by a 405 nm laser beam. Two different backing pressures of the valve were used: 3 bar (top row) and 15 bar (bottom row).
Figure 12:
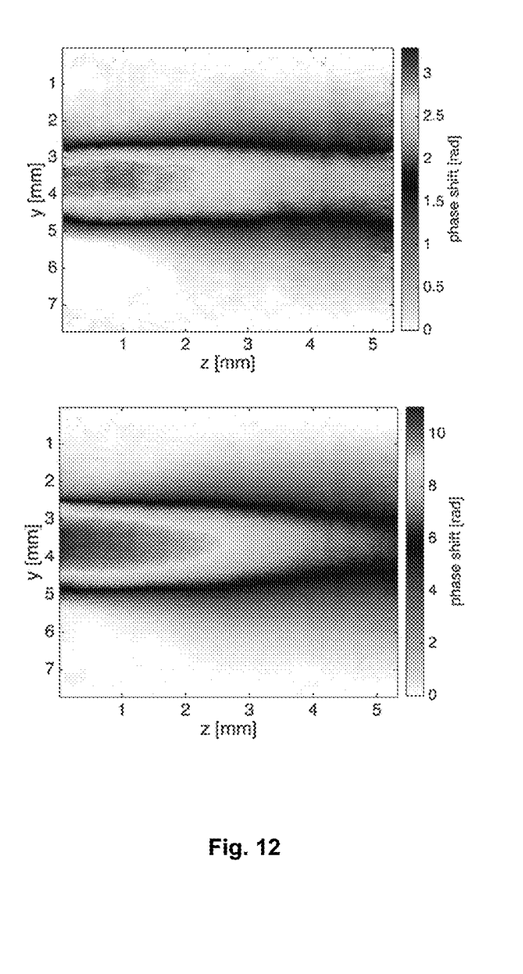
FIG. 12 shows phase maps recorded in accordance with the embodiment shown in FIG. 3. (without the use of a reference beam) using a imaging lens and a wavefront sensor to analyse the effect of the object on the phase of the probe beam. The object was a supersonic argon gas jet probed by a 405 nm laser beam. Two different backing pressures of the valve were used: 3 bar (top) and 15 bar (bottom).

The present disclosure further discloses, on FIGS. 11 and 12, results from experiments carried out according to the embodiments shown in FIGS. 3 and 5.

INDUSTRIAL APPLICABILITY

The present invention with respect to the above mentioned embodiments find particular use in optical imaging, interferometry, holography, polarimetry, and/or ellipsometry.

REFERENCE SIGNS LIST 1 probe beam, e.g. an electromagnetic radiation such as optical beam such as laser in VIS, IR, UV, XUV or mass particle beam such as electron, proton, neutron beam;
1' recombined beam
21 beam splitter
22 polarizing beam splitter
3 first part beam, probe beam
30 means for imaging the object on itself while preserving the beam divergence
31 reflected first part beam
4 imaging system (e.g. a lens)
5 concave reflector, e.g. concave mirror
6 object (with the meaning of geometrical optics)
6' image of an object (6)
7 second part beam (reference beam)
8 planar reflector, e.g. planar mirror
9 system for imaging of the object plane on a detector, e.g. a lens
10 image of an object (6) suitable for detection
11 detector such as area array detector (e.g. CCD camera) with imaging lens, wavefront sensor, or another detection device enabling spatial mapping of beam properties
110 area array detector (e.g. CCD camera)
12 Pockels cell
λ/4 quarter-wave plate
λ/2 half-wave plate

The invention claimed is:

1. A device for high-contrast imaging comprising:
a beam splitter for splitting a beam into a probe beam and a reference beam, wherein the probe beam is directed to an object;
a self-imaging system for receiving the probe beam from the object and imaging the object on itself, wherein the beam interacts with the object at least twice; and the reflected probe beam is further directed to the splitter after the last interaction; and
a detection means for receiving the reflected probe beam from the splitter.

2. The device according to claim 1, wherein the self-imaging system comprises an imaging element; and a concave mirror receiving the probe beam from first interaction with the object, wherein the concave mirror reflects the probe beam back to the imaging element providing the reflected probe beam.

3. The device according to claim 1, wherein the beam splitter is a partially reflecting mirror or a polarizing beam splitter or a diffraction grating.

4. The device according to claim 1, wherein the reference beam is reflected by a planar mirror back to the splitter and is recombined with the reflected probe beam; and wherein the detection means detects an interferometry pattern.

5. The device according to claim 1, wherein the object of interest is a transparent object.

6. The device according to claim 1, wherein the object of interest is a reflective interface.

7. The device according to claim 1 further comprising a quarter-wave plate positioned between the beam splitter and the object.

8. The device according to claim 1 further comprising a half-wave plate positioned between the beam splitter and the object.

9. The device according to claim 1, wherein the detection means further comprises an imaging system for focusing the beam on a detector.

10. A device for high-contrast imaging comprising:
the beam splitter according to claim 1;
a polarizing beam splitter for receiving the probe beam from the splitter and directing the probe beam according to its polarization to an object, wherein the beam is an electromagnetic radiation beam;
a first branch comprising:
a quarter-wave plate receiving the probe beam from the object;
a first self-imaging system receiving the beam from the quarter-wave plate;
wherein the first branch reflects the beam back to the quarter-wave plate, the object and a polarizing beam splitter;
a second branch for receiving the beam from the first branch, wherein the second branch comprises a second self-imaging system; and
the detection means according to claim 1.

11. The device according to claim 10, wherein the reference beam is reflected by a planar mirror back to the splitter and is recombined with the reflected probe beam, wherein the detection means detects an interference pattern.

12. A device for high-contrast imaging comprising:
the beam splitter according to claim 1, wherein the beam is a pulsed laser radiation beam;
the polarizing beam splitter for receiving the probe beam from the splitter and directing the probe beam according to its polarization to an object, wherein the beam is an electromagnetic radiation beam;
a first branch comprising:
a Pockels cell receiving the beam from the splitter and transmitting the beam from an object of interest;
a first self-imaging system receiving the beam from the object of interest and reflecting the beam back to the Pockels cell, the object and the polarizing beam splitter;
the second branch according for receiving the beam from the first branch, wherein the second branch comprises a second self-imaging system; and
the detection means according to claim 1.

13. A method for high-contrast imaging, the method comprising the step of:
a. providing an incident beam directed to a beam splitter splitting the beam into a probe beam and a reference beam, wherein the probe beam is directed to an object;
b. providing a first interaction of the probe beam with an object;
c. providing an image of an object on itself, wherein a reflected probe beam interacts with the object at least twice;
d. directing of the reflected probe beam to the beam splitter after the last interaction; and
e. detecting the beam.

14. The method according to claim 13, step c further comprising:
f. focusing of the probe beam by an imaging system; and
g. reflecting the probe beam on a concave mirror for providing the reflected probe beam;
h. directing the reflected probe beam back to an imaging system and object.

15. The method according to claim 13, the method further comprising the step of:
  i. detecting an interference pattern via a recombined beam.

16. The method according to claim 13, wherein the interaction of the probe beam with an object is a transmission or reflection, wherein the object is affecting an amplitude, phase or polarization of the probe beam.

17. The method according claim 13, wherein the method comprises a step of providing a circular polarization of the probe beam before step b).

18. The method according to claim 13, wherein the method comprises the step of turning the polarization vector of the probe beam before step b).

19. The method according to claim 15, wherein the beam is an electromagnetic radiation beam, the method further comprising the steps in the following order:
  j. further directing the probe beam to a polarizing beam splitter;
  k. splitting the probe beam according to its polarization, wherein the probe beam is directed to an object;
  l. providing a change of polarization via double transmission through a quarter-wave plate;
  m. focusing and reflection of the probe beam on a first self-imaging system of the object;
  n. transmission through or reflection on the polarizing beam splitter;
  o. focusing and reflection of the probe beam on a second self-imaging system of the object;
  p. transmission through or reflection on the polarizing beam splitter;
  q. providing change of polarization via double transmission through the quarter-wave plate;
  r. focusing and reflection of the probe beam on a first self-imaging system of the object;
  s. reflection or transmission by the polarizing beam splitter.

20. The method according to claim 15, wherein the beam is pulsed laser radiation, the method further comprising the steps in the following order:
  t. further directing of the probe beam to a polarizing beam splitter;
  u. splitting the probe beam according to its polarization, wherein the probe beam is directed to an object;
  v. providing a change of polarization via transmission through a Pockels cell;
  w. focusing and reflection of the probe beam on a first self-imaging system of the object;
  x. transmission through or reflection on the polarizing beam splitter;
  y. focusing and reflection of the beam on a second means for self-imaging of the object;
  z. transmission through or reflection on the polarizing beam splitter;
  aa. providing change of polarization via the Pockels cell;
  bb. focusing and reflection of the probe beam on a first self-imaging system of the object;
  cc. reflection or transmission by the polarizing beam splitter.

* * * * *